(12) United States Patent
Lee et al.

(10) Patent No.: US 11,929,971 B2
(45) Date of Patent: Mar. 12, 2024

(54) EMAIL THREADING BASED ON MACHINE LEARNING

(71) Applicant: Microsoft Technology Licensing, LLC, Redmond, WA (US)

(72) Inventors: Charles Yin-Che Lee, Mercer Island, WA (US); Victor Poznanski, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/845,806

(22) Filed: Jun. 21, 2022

(65) Prior Publication Data

US 2023/0412549 A1      Dec. 21, 2023

(51) Int. Cl.
*H04L 51/216*      (2022.01)
*H04L 51/02*       (2022.01)
*H04L 51/42*       (2022.01)

(52) U.S. Cl.
CPC ............ *H04L 51/216* (2022.05); *H04L 51/02* (2013.01); *H04L 51/42* (2022.05)

(58) Field of Classification Search
CPC ....... H04L 51/216; H04L 51/42; H04L 51/02; H04L 12/813; H04L 41/026; G06F 9/451; G06Q 10/02
See application file for complete search history.

(56) References Cited

U.S. PATENT DOCUMENTS

| | | | |
|---|---|---|---|
| 7,506,263 B1 | 3/2009 | Johnston et al. | |
| 7,516,186 B1 * | 4/2009 | Borghetti | G06Q 10/107 715/752 |
| 8,233,885 B2 | 7/2012 | Kansal et al. | |
| 8,856,249 B2 | 10/2014 | Liberty et al. | |
| 8,949,283 B1 | 2/2015 | Cornwell et al. | |
| 9,043,403 B2 | 5/2015 | Schnitman et al. | |
| 9,553,839 B2 * | 1/2017 | Syri | H04L 51/214 |
| 10,021,059 B1 * | 7/2018 | Rao | H04L 63/0428 |

(Continued)

FOREIGN PATENT DOCUMENTS

| | | |
|---|---|---|
| WO | 2002023309 A2 | 3/2002 |
| WO | 2019177485 A1 | 9/2019 |

OTHER PUBLICATIONS

"AII Email Bot", Retrieved from: https://web.archive.org/web/20220125144837/https:/mailytica.com/en/ai-email-bot/, Jan. 25, 2022, 7 Pages.

(Continued)

*Primary Examiner* — Sargon N Nano
(74) *Attorney, Agent, or Firm* — Schwegman Lundberg & Woessner, P.A.

(57) ABSTRACT

Systems and methods are directed to email threading based on machine learning determined categories and features. A network system accesses a plurality of emails addressed to a user. The network system then classifies, using a machine learning model, each email into at least one of a plurality of categories. For a category of the plurality of categories, one or more feature values are extracted from each email in the category. Based on the category and the extracted feature values, the network system groups messages having a same feature value in the same category together into a single email thread. Information related to the single email thread is then presented at a client device of the user.

20 Claims, 5 Drawing Sheets

(56) References Cited

U.S. PATENT DOCUMENTS

| | | | |
|---|---|---|---|
| 10,171,404 B2 | 1/2019 | Mccaffrey et al. | |
| 10,353,994 B2* | 7/2019 | Upadhyay | G06Q 10/107 |
| 10,769,560 B1* | 9/2020 | Knas | G06Q 10/107 |
| 10,796,295 B2 | 10/2020 | Subbarayan et al. | |
| 10,965,692 B2 | 3/2021 | Philip et al. | |
| 11,080,667 B2 | 8/2021 | Amar et al. | |
| 11,184,317 B1* | 11/2021 | Doorn | H04L 51/234 |
| 11,310,182 B2* | 4/2022 | Liu | H04L 51/216 |
| 11,794,119 B2* | 10/2023 | Steigelfest | A63F 13/335 |
| 2006/0017983 A1* | 1/2006 | Syri | G06F 40/284 |
| | | | 358/402 |
| 2010/0076989 A1 | 3/2010 | Jakobson | |
| 2011/0295889 A1 | 12/2011 | Xu et al. | |
| 2013/0124548 A1* | 5/2013 | Chhaparia | G06Q 10/103 |
| | | | 707/758 |
| 2013/0268839 A1 | 10/2013 | Lefebvre et al. | |
| 2013/0318172 A1 | 11/2013 | Liberty et al. | |
| 2014/0046961 A1 | 2/2014 | Buchheit et al. | |
| 2015/0341300 A1* | 11/2015 | Swain | H04L 51/42 |
| | | | 707/738 |
| 2016/0006681 A1* | 1/2016 | Syri | G06F 40/216 |
| | | | 709/207 |
| 2016/0026931 A1* | 1/2016 | Tambos | G06N 20/00 |
| | | | 706/12 |
| 2016/0119265 A1* | 4/2016 | Akavaram | G06F 40/30 |
| | | | 709/206 |
| 2017/0220580 A1* | 8/2017 | Chi | H04L 51/216 |
| 2018/0123997 A1* | 5/2018 | Celedonia | H04L 67/306 |
| 2018/0232127 A1* | 8/2018 | Sharifi | H04L 51/42 |
| 2018/0234375 A1 | 8/2018 | Gray et al. | |
| 2018/0253659 A1 | 9/2018 | Lee et al. | |
| 2018/0351901 A1 | 12/2018 | Snider et al. | |
| 2019/0129749 A1* | 5/2019 | White | G06Q 10/109 |
| 2019/0164412 A1* | 5/2019 | Kennedy-Foster | |
| | | | G08B 13/19682 |
| 2019/0205395 A1* | 7/2019 | Bonin | G06N 20/00 |
| 2020/0120050 A1 | 4/2020 | Jung et al. | |
| 2020/0320116 A1 | 10/2020 | Wu | |
| 2020/0358735 A1 | 11/2020 | Sharp et al. | |
| 2020/0382447 A1* | 12/2020 | Huang | H04L 51/02 |
| 2020/0409962 A1* | 12/2020 | Sarkis | G06Q 50/01 |
| 2021/0105232 A1* | 4/2021 | Estrada | H04L 51/02 |
| 2021/0152506 A1* | 5/2021 | Liu | H04L 51/216 |
| 2021/0266282 A1 | 8/2021 | Tan et al. | |
| 2021/0273950 A1 | 9/2021 | Lawson | |
| 2021/0321165 A1* | 10/2021 | Yasir | H04N 21/4661 |
| 2021/0343179 A1* | 11/2021 | Gan | G06N 3/04 |
| 2022/0067750 A1 | 3/2022 | Williams et al. | |
| 2023/0177539 A1* | 6/2023 | Kotta | G06Q 30/0271 |
| | | | 705/7.32 |

OTHER PUBLICATIONS

"Email Bots: How to Automate Your Mailbox", Retrieved from: https://www.visor.ai/email-bots-how-to-automate-your-mailbox/, Aug. 20, 2020, 7 Pages.

"How to Show Most Recent Message on Top of Mail Threads in iOS Mail", Retrieved from: https://osxdaily.com/2016/12/05/mail-show-recent-messages-top-ios/, Dec. 5, 2016, 5 Pages.

Mhatre, et al., "Donna Interactive Chat-Bot Acting as a Personal Assistant", In International Journal of Computer Applications, vol. 140, Issue 10, Apr. 2016, pp. 6-11.

"International Search Report and Written Opinion Issued in PCT Application No. PCT/US2023/021086", dated Jun. 30, 2023, 14 Pages.

* cited by examiner

EMAIL THREADING BASED ON MACHINE LEARNING

TECHNICAL FIELD

The subject matter disclosed herein generally relates to email threading. Specifically, the present disclosure addresses systems and methods that thread emails based on machine learning determined categories and features derived from the emails.

BACKGROUND

Conventional email clients typically provide a conversation view or email thread that is based on a subject line or conversation identifier (ID). When an email gets created, a conversation ID is stamped on the email and any successive emails (e.g., replies) receives the same conversation ID. As such, emails with the same conversation ID appear at the client device as a single thread or conversation. However, a series of emails may not have a same subject line or conversation ID but be related. For example, an online order may have multiple emails with different subject lines (e.g., Your order XYZ has been received, Your order XYZ has shipped, Your order XYZ has been delivered) and may be sent from different senders (e.g., order@company.com; shipping@company.com; return@company.com). These emails will not be grouped into a single thread.

BRIEF DESCRIPTION OF THE DRAWINGS

Some embodiments are illustrated by way of example and not limitation in the figures of the accompanying drawings.

DETAILED DESCRIPTION

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Example embodiments provide a technical solution for dealing with the technical problem of handling a deluge of emails (e.g., auto-generated emails or system generated email notifications) that users receive from entities that the user has a relationship with (e.g., airlines, hotels, shopping sites, banks, schools). Many emails received by users are generated by systems, such as an upcoming bill reminder or an order confirmation. These emails typically represent or are a part of a workflow such that individual entails are actually a part of a whole process. For example, for an order, a user may receive an acknowledgement, shipment notification, delivery notification, as well as other potential notifications such as payment declined or item out of stock. In some cases, a sequence of emails creates state change(s) or may require an additional action to move forward. Those actions are typically represented by web links that direct the users out of the email.

Conventionally, a same order may result in multiple emails that may have different subject lines or be from different senders (e.g., order@company.com; shipping@company.com; returns@company.com). These emails show up as separate, unrelated emails in the user's inbox. Furthermore, a later email can update a status and render previous emails out-of-date. For instance, if an order has shipped, then it is meaningless to note that the order has previously been received or is being processed. This causes wasted time, computing resources, and cognitive load on the user's part to deal with multiple email threads that are related and/or containing irrelevant emails.

Example embodiments provide a new methodology for email threading that is based on machine learning determined categories and features instead of a subject line or conversation identifier. In example embodiments, each email is classified into one or more of a plurality of categories using a machine learning (ML) model that analyzes the content of each email. Using this ML model provides a technical advantage of higher accuracy in classifying emails and the retraining of the ML model improves that accuracy. In embodiments where an email is classified into more than one category, the categories can be ranked or organized into a hierarchy. Once categorized, the emails within a same category are analyzed and one or more feature values that uniquely identify a subject matter for a thread are extracted. Each category may comprise a different set of feature values. For instance, for an order category, the feature values can include an order identifier or vendor; for a trip category, the feature values can include a destination and dates; and for a bill category, the feature value can be a payee. Within the same category, emails that have a same extracted feature value(s) are group together and displayed as a single email thread whereby multiple related emails can be collapsed under a primary email.

For example, in a travel scenario, a user can book with an airline, rent a car from a rental agent, and book a stay at a hotel. Every vendor has a unique order identifier or reservation identifier and the entails come from different senders. To thread these emails together, other features need to be used. Thus, the emails are first classified under a travel or a trip category. Within the travel category, feature values are then extracted from each email, such as a destination and dates of the trip. The system can then thread together the airline ticket and car rental with the hotel stay based on overlapping dates and the destination. For instance, an airline ticket is purchased for a user flying to Chicago from Jun. 1, 2022 to Jun. 6, 2022, so the destination is Chicago;

there is a hotel reservation with overlapping dates with a Chicago address; and the user is renting a car from O'Hare (e.g., Chicago airport). Additionally, the user has booked reservations each night during those dates at restaurants in Chicago. Therefore, these restaurant reservations may be a part of the same travel email thread. Further still, the restaurant reservations can be in other categories of dining or reservations. In these cases, a determination of which email thread to include the restaurant reservation emails in will depend on matching feature value(s). In some embodiments, the email thread can be identified with a message title that reflects the feature value(s). In this example, the title can be, for example, "Chicago—Jun. 1-6, 2022."

In some cases, a state value indicating a state of a subject matter of the email is also extracted from the emails. For instance, if the subject matter is an order, the state values can include received, shipped, in transit, delivered, and/or returned. For an email thread, an email having a latest or current state based on the extracted state values may be shown as the primary email (e.g., top email in the message thread), In some embodiments, emails with a previous state may be deleted, archived, or marked for deletion from the email thread. This provides the technical advantage of allowing for storage space to be freed up and decluttering an email inbox.

In some embodiments, a chatbot can be used to present information from the email thread to a user resulting in the user not having to use an email client or read the email details to get information contained in the email or to take action. In these embodiments, a user can naturally interact with the chatbot and provide instructions including preferences for what gets presented to the user. Example embodiments can use the instructions to train/retrain a preference model such that future presentation of information from email threads by the chatbot are customized to the latest user preferences thus providing a technical benefit.

As a result, one or more of the methodologies described herein facilitate solving the technical problem of managing and displaying related email that have different subject lines or be from different senders. Example embodiments use machine learning models to categorize and group related emails into a single email thread that is organized for a user. Thus, a user can, for example, simply view a last (primary) email in the email thread. Furthermore, previous emails in the email thread can be automatically deleted, archived, or marked for deletion. As such, one or more of the methodologies described herein may obviate a need for certain efforts or computing resources that otherwise would be involved in storing and displaying emails. Examples of such computing resources include processor cycles, memory usage, data storage capacity, power consumption, and network bandwidth.

Figure 1:
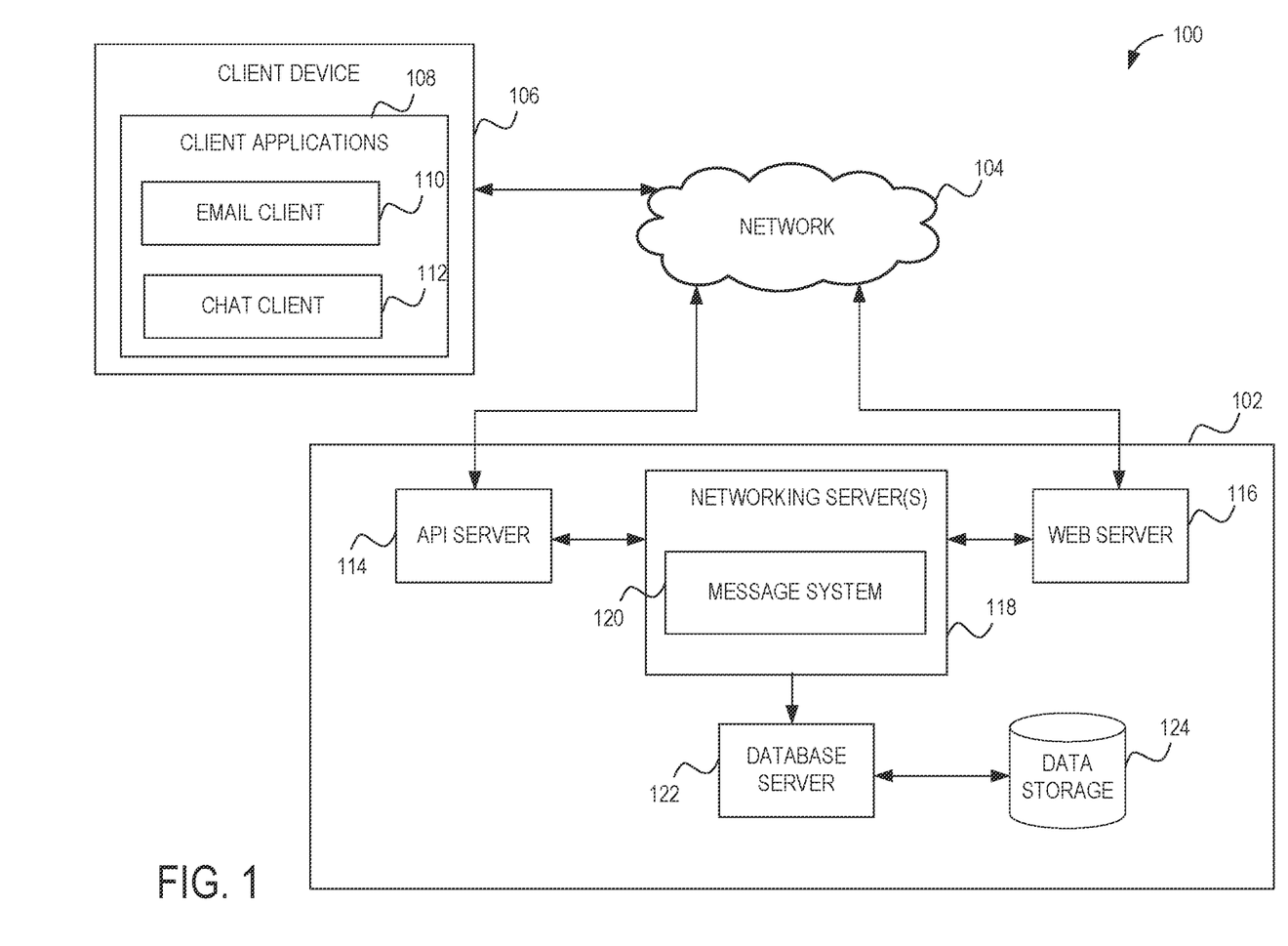
FIG. 1 is a diagram illustrating a network environment suitable for email threading based on machine learning determined categories and features, according to some example embodiments.

FIG. 1 is a diagram illustrating a network environment 100 suitable for email threading based on machine learning determined categories and features, in accordance with example embodiments. A network system 102 provides server-side functionality via a communication network 104 (e.g., the Internet, wireless network, cellular network, or a Wide Area Network (WAN)) to a client device 106 that includes a client application 108. In example embodiments, the network system 102 trains and/or uses machine learning (ML) models to analyze, categorize, and group related email having different subject lines, conversation identifiers, and/or senders into a single email thread. While example embodiments generally discuss threading emails, alternative embodiments may contemplate analyzing and organizing (e.g., into a message thread) other types of messages (e.g., chats).

In example embodiments, the client device 106 is a device of a user of the network system 102 that receives, views, and responds to emails and other messages (e.g., instant messaging or chats). The client device 106 includes client applications 108, one or more of which can be used to generate and/or view messages. For example, the client applications 108 can include an email client 110 and a chat client 112. The email client 110 is used by the client device 106 to access and manage emails at the client device 106. Specifically, the email client 110 communicates with the network system 102 to access a remote mail storage (e.g., mailbox) and download emails to the client device 106. In various embodiments, the email client 110 works with the network system 102 to provide grouped emails in a single email thread as will be discussed in more detail below.

The chat client 112 manages instant messages at the client device 106. In some embodiments, the chat client 112 can provide a chatbot that simulates a conversation with the user. The chatbot can provide information related to the grouped emails within a single email thread in a chat interface as will be discussed in more detail below.

The client device 106 interfaces with the network system 102 via a connection with the network 104. Depending on the form of the client device 106, any of a variety of types of connections and networks 104 may be used. For example, the connection may be Code Division Multiple Access (CDMA) connection, a Global System for Mobile communications (GSM) connection, or another type of cellular connection. Such a connection may implement any of a variety of types of data transfer technology, such as Single Carrier Radio Transmission Technology (1xRTT), Evolution-Data Optimized (EVDO) technology, General Packet Radio Service (CPRS) technology, Enhanced Data rates for GSM Evolution (EDGE) technology, or other data transfer technology (e.g., fourth generation wireless, 4G networks, 5G networks). When such technology is employed, the network 104 includes a cellular network that has a plurality of cell sites of overlapping geographic coverage, interconnected by cellular telephone exchanges. These cellular telephone exchanges are coupled to a network backbone (e.g., the public switched telephone network (PSTN), a packet-switched data network, or other types of networks.

In another example, the connection to the network 104 is a Wireless Fidelity (Wi-Fi, IEEE 802.11x type) connection, a Worldwide Interoperability for Microwave Access (WiMAX) connection, or another type of wireless data connection. In such an embodiment, the network 104 includes one or more wireless access points coupled to a local area network (LAN), a wide area network (WAN), the Internet, or another packet-switched data network. In yet another example, the connection to the network 104 is a wired connection (e.g., an Ethernet link) and the network 104 is a LAN, a WAN, the Internet, or another packet-switched data network. Accordingly, a variety of different configurations are expressly contemplated.

The client device 106 may comprise, but is not limited to, a smartphone, tablet, laptop, multi-processor systems, microprocessor-based or programmable consumer electronics, game consoles, set-top boxes, a server, or any other communication device that can access the network system 102. In some embodiments, the client device 106 comprises a display module (not shown) to display information (e.g., in the form of user interfaces).

Turning specifically to the network system 102, an application programing interface (API) server 114 and a web server 116 are coupled to, and provide programmatic and web interfaces respectively to, one or more networking servers 118 (or application servers). The networking server (s) 118 host a message system 120, which comprises a plurality of components, and which can be embodied as hardware, software, firmware, or any combination thereof. The message system 120 will be discussed in more detail in connection with FIG. 2.

The networking servers 118 are, in turn, coupled to one or more database servers 122 that facilitate access to one or more information storage repositories or data storage 124. In some embodiments, the data storage 124 is a storage device storing ML models, user accounts include user preferences, and/or messages (e.g., emails).

In example embodiments, any of the systems, servers, data storage, or devices (collectively referred to as "components") shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 5, and such a special-purpose computer is a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the components illustrated in FIG. 1 may be combined, and the functions described herein for any single component may be subdivided among multiple components. Additionally, any number of client devices 106 may be embodied within the network environment 100. While only a single network system 102 is shown, alternative embodiments contemplate having more than one network system 102 to perform server operations discussed herein for the network system 102 (e.g., each localized to a particular region).

Figure 2:
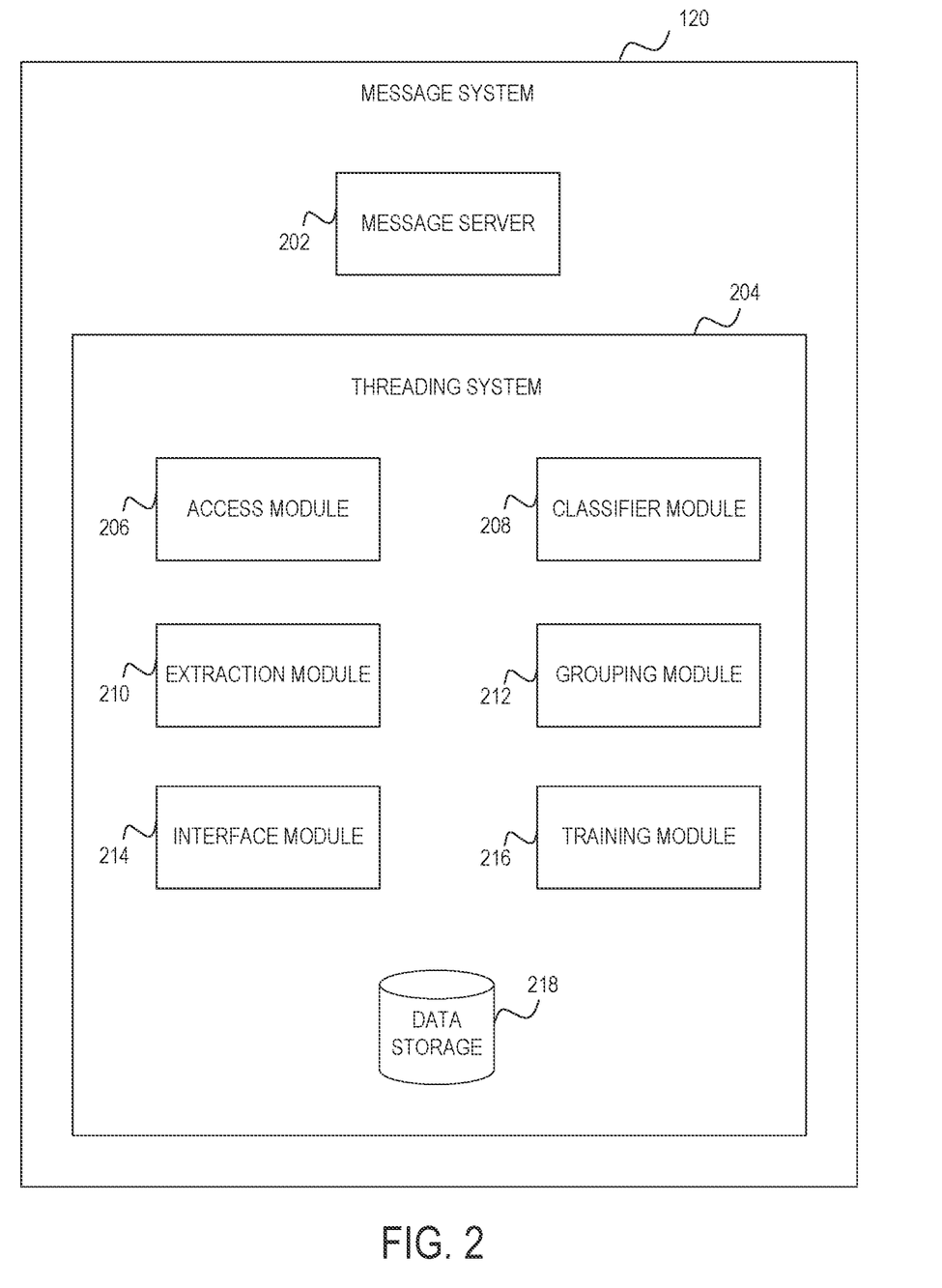
FIG. 2 is a diagram illustrating a message system, according to some example embodiments.

FIG. 2 is a diagram illustrating components of the message system 120, according to some example embodiments. In some embodiments, the message system 120 includes a cloud-based version of a client applications at the client devices 106. The message system 120 may also train and/or use MI, models to categorize emails and extract feature values. As such, the message system 120 comprises a message server 202 and a threading system 204. While embodiments are discussed whereby the threading system 204 is separate but coupled to the message server 202, some embodiments may include some or all of the components/functionalities of the threading system 204 in the message server 202.

The message server 202 comprises a system that sends, receives, and stores messages on behalf of the user. The message server 202 can be an email server that manages emails. Alternatively, the message server 202 can be a chat server that handles and maintains chat messages. For ease of discussion, example embodiments will be discussed based on emails being organized into email threads; however, example embodiments can easily be applied to instant messages or chats.

The threading system 204 is configured to analyze and group mails into email threads using machine learning. The threading system 204 can also provide the email threads to the email client 110 or provide information from the email threads as chat messages or through a chatbot via the chat client 122. To enable these operations, the threading system 204 comprises an access module 206, a classifier module 208, an extraction module 210, a grouping module 212, an interface module 214, a training module 216, and a data storage 218.

The access module 206 is configured to access emails to be analyzed and grouped. In particular, the access module 206 accesses a plurality of emails addressed to a particular user (e.g., the user of the client device 106). The emails can be accessed from the message server 202 (e.g., a data storage associated with the message server 202) periodically, at a predetermined time, or based on an event (e.g., when a threshold number of emails have been received, each time a new email is received, when a user activates their email client 110, when the email client 110 requests new emails).

The classifier module 208 is configured to classify each accessed email into at least one base thread category. In example embodiments, the classifier module 208 uses one or more ML (classification) models to categorize the emails into one or more of a plurality of thread categories. The classification models can comprise natural language processing (NLP) neural network models. Specifically, the content of the emails is applied to the classification model, which predicts one or more categories for each email. In example embodiments, the classification model (e.g., classification algorithm) predicts a likelihood or probability that the content of the email falls into one or more of a plurality of predetermined (thread) categories. In some cases, the highest probability categories are used. In some cases, one or more categories that exceed a probability threshold may be used. The plurality of thread categories can include, for example, order, bill, trip, account, promotion, school, or any other type of category for which a user can receive a series of emails. The classifier module 208 may then group the emails by a same category.

The extraction module 210 is configured to extract one or more feature values from each email in the same category. These feature values are used to differentiate between emails in the same category (e.g., emails regarding multiple orders in the order category, emails regarding different trips in a trip category). The feature values each uniquely identify a subject matter of a thread (e.g., an identifier of the thread) in the category. For example, the feature values for an order category can be an order identifier, vendor, and/or purchase date; the feature values for a trip category can be a destination and dates; the feature value for a bill category can be a payee; or the feature value for a school category can be a class, subject matter, and/or due date. In example embodiments, a natural language processing (ML) model (e.g., feature value model) is used to extract the feature values. In example embodiments, the ML model is trained with a dataset of feature values for each category. At runtime, this ML model can identify and extract one or more feature values from the content of each email. In some cases, the ML model used to classify the emails may also identify the feature values.

In cases where emails are categorized into more than one category, the extraction module 210 can extract one or more feature values from these emails and those feature value(s) are used to select a category to include the emails for threading purposes. Specifically, the selected category is a category in which the extracted feature value(s) have the highest percentage match with extracted features values of other emails in the same category. The selection can be performed by the extraction module 210 or another component of the threading system 204 (e.g., the classifier module 208 or grouping module 212).

In some cases, the extraction module 210 is also configured to extract a state value from the emails. The state value indicates a state or status of a subject matter of the email. For example, if the subject matter of the email is an order, then the state value can indicate whether the order is received, being processed, shipped, in transit, delivered, and/or returned. In another example, if the subject matter of the email is a bill, then the state value can indicate whether the bill is posted, paid, and/or past due. Further still, if the subject matter is a school homework assignment, then the state value can indicate whether the homework assignment is assigned, completed or submitted, received, missing a portion, and/or graded. For a travel category, the state values can indicate, for example, booked, confirmed, and/or paid. In some cases, multiple states can be pending at the same time. For example, an order can contain multiple items that shipped separately resulting in multiple shipped states. In this situation, there can be multiple states in a single email thread or multiple email threads (e.g., one for each shipment) for the order. Here too, a ML model can be used by the extraction module 210 to identify and extract the state values. In example embodiments, the ML model is trained with a dataset of state values for each category. At runtime, this ML model can identify and extract the state value from the content of each email. In some cases, the ML model used to classify the emails may also identify the state values, or the ML model used to identify the feature values is also used to identify the state values.

The extraction module 210 can also be configured to extract information and actions (e.g., action links) from the body of the emails. The extracted information and actions can be used, for example, in generating the chat messages and chat buttons as will be discussed further below. Further still, information can be extracted from replies to emails and used to train user preferences, as will be discussed in more detail below.

The grouping module 212 is configured to group emails with the same feature value(s) in the same category into a single email thread. The grouping module 212 can order the emails in the email thread by date or state/status such that a hierarchy of emails is created. In some embodiments, the grouping module 212 can organize the emails in the email thread using a display template or event structure. Each category may have a different display template. The display template organizes the multiple emails in the email thread whereby redundant or irrelevant information can be eliminated and pertinent values (e.g., current state) can be elevated.

In some embodiments, the grouping module 212 (e.g., based on the display template) may automatically delete, archive, or mark for deletion older emails in the email thread that may no longer be relevant. For example, entails regarding the receipt of an order and shipping of the order (e.g., a previous state) are no longer relevant in light of an email indicating delivery of the order (e.g., a current state). In cases where multiple emails have a same current state (e.g., multiple emails each regarding item(s) in an order that are shipped separately), the multiple emails are kept (e.g., not deleted or archived) and displayable to the user in the email thread. In this case, one of the emails having the current state may be selected as the primary email in the email thread (e.g., the newest).

In some instances, the automatic deletion, archival, or marking for deletion is based on a predetermined setting or user preferences (e.g., default, user indicated, or system derived settings). Further still, the user preferences can be machine-learned. For example, if the user consistently deletes or ignores (e.g., does not view) older emails in an email thread, the system (e.g. a ML model) learns this preference so that older emails in future email threads may be automatically deleted or marked for deletion.

The interface module 214 is configured to present the email thread or information regarding the email thread to the client device 106. For an email client, the interface module 214 can provide the email thread to the email client 110 for display. For example, emails received for a given order are aggregated together to show that they are all notifications for the same order within a single email thread.

In some embodiments, the interface module 214 provides information regarding the email thread in other platforms such as a social networking or chat platform. In the case of a chat platform, the information is provided to a chat client (e.g., chat client 112), which can present the information as a chat (message) thread or using a chatbot. In these embodiments, a user preference in an email inbox (e.g., in the message server 202) can indicate a chat client username and for information regarding emails to go to the chat client 112. Based on these user preferences, the interface module 214 takes pertinent information from the emails (e.g., extracted by the extraction module 210) in the email thread and pushes the information to the chat client 112 using messaging application programing interfaces e.g., via the API server 114), As such, the interface module 214 acts like another chat client user that is chatting with the user at the client device 106. The chatbot can then, for example, have a conversation with the user based on each email thread and present information in the context of an overall flow. The chatbot can also notify a user whenever an email is detected that is associated with an existing chat thread.

Each identified flow can be communicated to the user via a separate chat thread with a delineating chat title so that the use can keep track of separate chat threads. For example, if the user makes a purchase at CompanyA, CompanyA usually sends an acknowledgement email immediately. The classifier module 208 identifies the category of the email (e.g., order category) and the extraction module 210 extracts an order identifier (e.g., order identifier (ID) 123) as well as other pertinent information (e.g., item(s) and price(s)). The chatbot can then begin a new conversation with the user and set the chat title to "Your CompanyA order ID: 123." In a chat window, the chatbot can describe the purchases (e.g., items and prices). Next, when the user receives the order shipping email from CompanyA, the chatbot can add to the conversation and state that the order has shipped. A further chat message can be added to the chat thread when the order is delivered. The messages presented by the chatbot can be presented right when the corresponding email is received by the message server 202—providing a near real-time status of the order. Thus, the chatbot is proactive in notifying the user with relevant state changes and maintains a history of the workflow via the chat thread.

In some embodiments, the network system 102 can leverage a software development kit (SDK) associated with the chat client 112 to show action buttons/icons in addition to informing the user of actions that the user can perform with respect to the chat thread. In some cases, the button can be associated with an action or action link identified/extracted from the body of the email by the extraction module 210. Thus, in the order example, a user can be notified that they can cancel their order in the next several minutes by selecting a cancel button, which may take the user to a website where the user can cancel the order. For example, the extraction module 210 can extract out a link (e.g., relevant cancel link) and the user can be informed of the status update and presented the action the cancel button), As a result, the user can cancel without having to deal with the email client 110. Other actions are also contemplated by example embodiments such as, for example, fraud detection (e.g., confirm transaction or flag as fraudulent), survey (e.g., "How was the delivery?" Select thumbs up icon or thumbs down icon), and/or event/reservation confirmation (e.g., add to calendar).

Further still, the user can instruct the chatbot regarding the information that the user wants presented. For example, the user may only want a notification or message if there is a problem with an order or when the order ships e.g., after an initial acknowledgement message). In another example, the user may want restaurant reservations during a trip to be a separate chat thread from a trip chat thread that provides information regarding air, hotel, and car rental. These instructions are received by the interface module 214 as preferences, which can be used, by the training module 216, to learn user preferences. As a result, future similar chat threads will have the same user preferences applied.

In cases having multiple states pending at the same time (e.g., multiple items in an order shipping separately), there can be multiple states in a single chat thread or multiple chat threads (e.g., one for each shipment). Here, the user can instruct the chatbot as to how to track the shipments (e.g., together or separately). These preferences can also be stored or used to train a ML preference model.

Further still, the user can indicate to combine multiple chat threads. For example, a first chat thread may be a trip thread that contains air, hotel, and car rental emails while a second chat thread may be a restaurant thread that contains restaurant reservations for a same trip as the trip thread. Here, the user can provide instructions to the chatbot to combine the messages in the two chat threads (e.g., each corresponding to a different email thread) into a single chat thread. These preferences can also be stored or used to train a ML preference model.

Additionally, if the interface module 214 or chat client 112 is unsure whether two chat threads should be combined in a single chat thread, the interface module 214 or chat client 112 may ask the user via a chat message. The user's instructions in response comprises further training data for training the ML preference model.

As the emails are received by the message server 202, the emails are provided to the client device 102 substantially in real-time. The user, however, may not view the messages at that time. As such, the interface module 214 can provide a signal to override or delete an email or chat associated with a previous state if the email or chat in a corresponding thread is no longer applicable. For example, if a user never viewed an order acknowledgement message by the time the order ships, the order acknowledgement message makes no sense, so the interface module 214 can trigger a status update at the client device 106 (e.g., update the displayed email thread or chat thread).

The training module 216 is configured to machine train one or more ML models used by the threading system 204. For example, the training module 216 can train one or more classification models to classify messages into categories or train one or more feature/state value models to identify feature values and state values. The training module 216 can also train one or more preference models that identify user preferences in presenting the email threads or chat threads.

In training classification models, pre-categorized training datasets can be used to train the classification model which can leverage a wide range of algorithms to classify future datasets e.g., emails) into respective categories. The classification algorithms utilize the training data for the purpose of predicting a likelihood or probability that the data that follows (e.g., future emails) falls into one of a plurality of predetermined categories. The feature/state value models can be trained in a similar manner (e.g., with a dataset of feature values and state values for each category).

The training module 216 also Obtains feedback that is used to retrain one or more of the ML models. In some cases, the feedback can be obtained from users of the email threads or the chat threads. The feedback can be active providing instructions to perform an operation or change what is displayed) or passive (e.g., deleting emails without viewing, moving different email message threads into a same email folder). This information can then be used as a dataset by the training engine 204 for retraining the models.

In training the preference model, operations or responses performed using the email client 110 or conversations conducted using the chat client 112 can be used to train/retrain the preference models to understand the preferences of the user and preferences of a group of users (e.g., within the same team, organization, company). In example embodiments, the training module 216 analyzes the operations, responses, and instructions. If the user is, for example, correcting the chatbot or providing instructions to perform an action (e.g., only notify me when shipped or when there is a problem, keep restaurant thread separate from trip thread), the training module 216 takes that feedback and retrains the preference model to learn preferences for the user and the group of users. Thus, for example, for a next vacation, the threading system 204 may group all the restaurant reservations in a separate thread from a trip thread containing air, hotel, and car reservations because that was the preference the last few times for the user.

The trained models can be stored to the data storage 218. Additionally, user preferences and instructions can also be stored to the data storage 218. Alternatively or additionally, the models, preferences, or instructions can be stored to the data storage 124.

Figure 3:
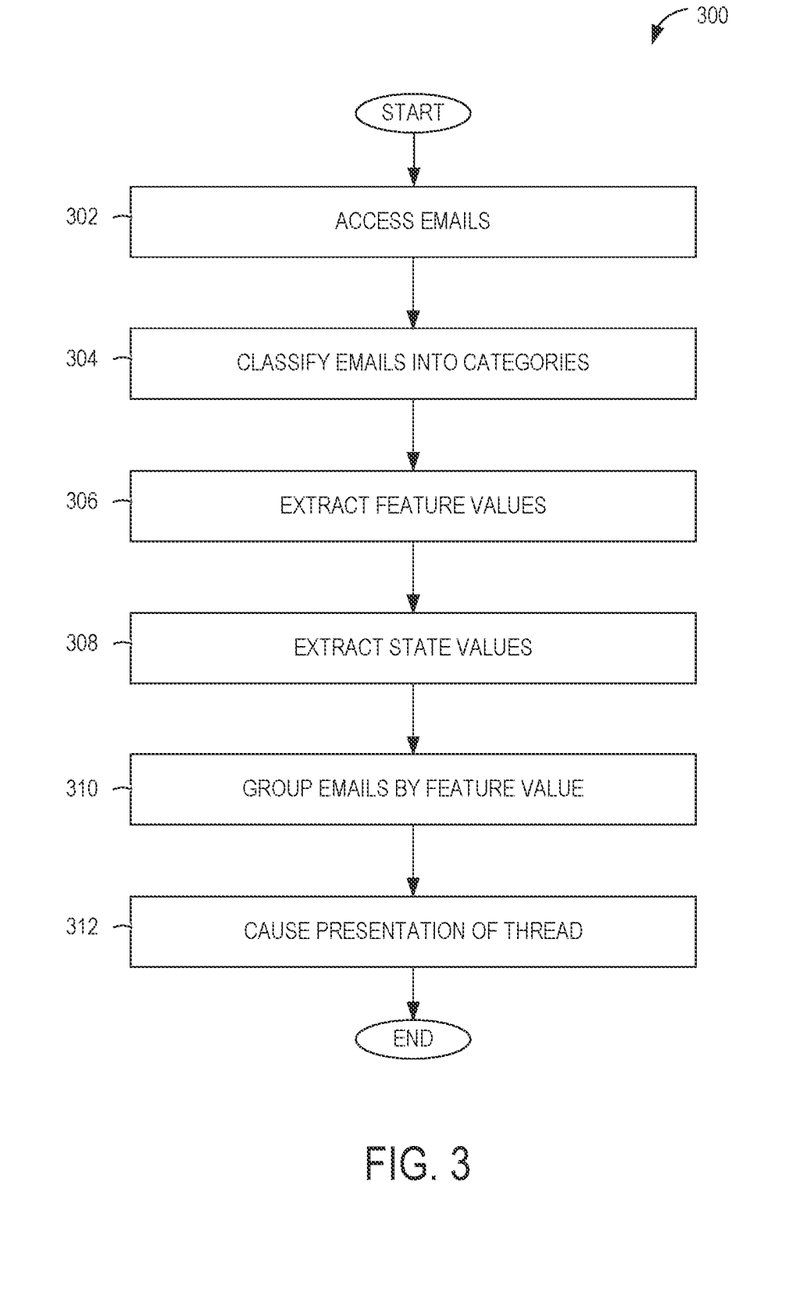
FIG. 3 is a flowchart illustrating operations of a method for email threading based on machine learning determined categories and features, according to some example embodiments.

FIG. 3 is a flowchart illustrating operations of a method 300 for email threading based on machine learning determined categories and features, according to some example embodiments. Operations in the method 300 may be performed by the message system 120, using components described above with respect to FIG. 2. Accordingly, the method 300 is described by way of example with reference to the message system 120. However, it shall be appreciated that at least some of the operations of the method 300 may be deployed on various other hardware configurations or be performed by similar components residing elsewhere in the network environment 100. Therefore, the method 300 is not intended to be limited to the message system 120.

In operation 302, the access module 206 accesses the entails to be analyzed and grouped. For example, the access module 206 accesses a plurality of emails addressed to a particular user (e.g., the user of the client device 106) from the message server 202 (e.g., a data storage associated with the message server 202). In some embodiments, the access module 206 only accesses new emails (e.g., emails received since the last email threading analysis).

In operation 304, the classifier module 208 classifies each of the emails into one or more base thread categories. In example embodiments, the classifier module 208 uses a ML classification model (e.g., a NLP neural network model) to categorize the emails into one or more of a plurality of categories that the ML classification model has been trained with. Specifically, the content of the emails can be applied to the NIL classification model, which identifies at least one category for each email. The classifier module 208 may then group the emails by a same category.

In operation 306, the extraction module 210 extracts, using a natural language ML model, one or more feature values from each email in a same category. These feature values are used to differentiate between emails in the same category (e.g., emails from multiple orders, multiple bills, or multiple homework assignments). The feature values can each uniquely identify a thread (e.g., a subject matter of the thread) in the category. In some embodiments, the ML model used to classify the emails may also be used to identify the feature values for extraction.

In operation 308, the extraction module 210 extracts, using a natural language ML model, a state value from the emails in a same category and potentially in a same thread. The state value indicates a state or status of a subject matter of the email. For example, the state value can indicate a status of an order, a status of payment of a bill, or a status of a travel booking/reservation. Not every category, thread, or email may have a state value. Therefore, operation 308 may be optional in some embodiments.

In operation 310, the grouping module 212 groups mails with the same feature value(s) in the same category into a single email thread. The grouping module 212 can order the emails in the email thread by date or status (e.g., state value) such that a hierarchy of mails is created (e.g., a primary email with older emails collapsed beneath). In some embodiments, the grouping module 212 can organize the emails in the email thread using a display template or event structure. The display template organizes the multiple emails in the email thread whereby redundant or irrelevant information can be eliminated and pertinent values (e.g., current state) can be elevated. In some cases, the grouping module 212 can automatically delete, archive, or mark for deletion (e.g., based on the display template) older emails in the message thread that have a previous state and may no longer be relevant (e.g., based on user preferences). Any emails having the current state can be maintained in the email thread.

In operation 312, the interface module 214 causes presentation of the email thread or information regarding the email thread at the client device 106. For an email embodiment, the interface module 214 can provide the email thread to the email client 110 for display and/or update an existing email thread with one or more related new emails.

In a chat embodiment, the interface module 214 provides pertinent information from the email thread to the chat client 112, which can present the information using a chatbot. In these embodiments, the interface module 214 obtains a chat client username for the user. The interface module 214 takes pertinent information from the emails in the email thread (e.g., extracted by the extraction module 210) and transmits the information to the chat client 112 using a messaging API. As such, the interface module 214 acts like another chat client user that is chatting with the user. The chatbot can then have a conversation with the user by presenting the pertinent information in a chat thread. In embodiments where an action is available, the interface module 214 may provide (or provide instructions) to the chat client 112 to present an action icon in a chat window. Selection of the action icon can cause the action to occur or cause presentation of a webpage where the user can perform the action.

In some embodiments, state information may be graphically indicated in the email thread or chat thread such that complex states/status is rolled up in a convenient manner. For instance, all relevant states leading to a current state can be graphically displayed and previous states can be marked as completed. In some cases, future states can be included and shown as unmarked. As an example, in a homework embodiment, if a student reviewed a homework assignment and submitted the assignment but there is something missing, a status icon for the viewing and submission may be visually distinguished (e.g., checked or filled in with a particular color) from a status icon for assignment completion (e.g., unchecked or filled in with a different color) to indicate that there is an exception/incomplete state.

Figure 4:
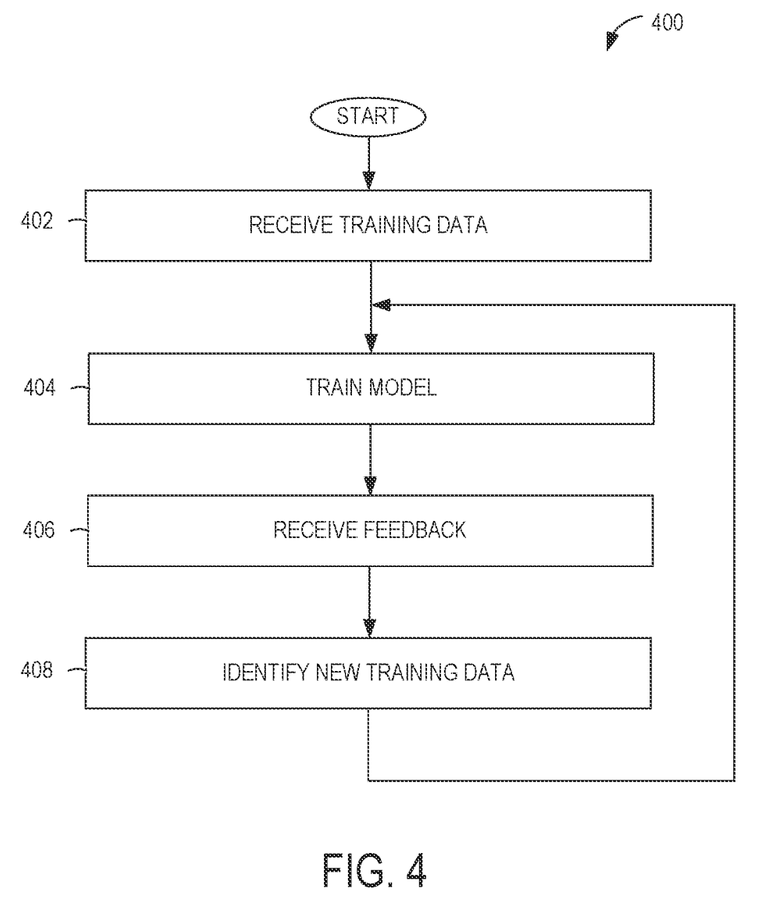
FIG. 4 is a flowchart illustrating operations of a method for training a model used for email threading, according to some example embodiments.

FIG. 4 is a flowchart illustrating operations of a method 400 for training models used for email threading, according to some example embodiments. Operations in the method 400 may be performed by the training module 216, using components described above with respect to FIG. 2. Accordingly, the method 400 is described by way of example with reference to the training module 216. However, it shall be appreciated that at least some of the operations of the method 400 may be deployed on various other hardware configurations or be performed by similar components residing elsewhere in the network environment 100. Therefore, the method 400 is not intended to be limited to the training module 216.

In operation 402, the training module 216 receives training data. For a classification model, a pre-categorized training dataset can be used to train the classification model which can leverage a wide range of algorithms to classify future datasets (e.g., mails) into respective categories. Similarly, for a feature value model, a training dataset of feature values for each category may be used to train the feature value model. For state value model, a training dataset of state values for each category may be used to train the state value model. In various cases, the classification model, the feature value model, and the state value model comprise natural language processing models. Further still, the classification model, the feature value model, and/or the state value model may be the same ML model.

For a chat preference model, the instructions received from the chat client 112 can be used to train the preference model for preferences of the user and/or preferences of a group of users (e.g., within the same team, organization, company). For example, the training module 216 analyzes the responses and instructions given to the chatbot to obtain the training data. Similarly for an email preference model, the training module 216 can analyze operations performed with email threads or responses to emails to obtain training data.

In operation 404, the training module 216 trains the respective ML models. In example embodiments, the training data is fed to the models being training. The machine learning can occur using, for example, linear regression, logistic regression, a decision tree, a neural network, k-nearest neighbors, and/or k-means.

In operation 406, the training module 216 receives feedback. The feedback can be obtained from users of the email threads or the chat threads. For example, if the user is correcting the chatbot or providing instructions to perform an action (e.g., only notify me when shipped or a problem, keep restaurant message thread separate from trip message thread), the training module 216 receives that feedback. The feedback can also be passive (e.g., deleting emails without viewing, moving different email message threads into a same email folder).

In operation 408, the training module 216 identifies new training data from the feedback. The new training data can then be used to retrain the respective model. Thus, operations 404 to 408 of the method 400 are periodically repeated.

While the operations of FIG. 3 and FIG. 4 are shown in a particular order, alternative embodiments may practice the operations in a different order. Additionally, one or more of the operations may be made optional in various embodiments.

Figure 5:
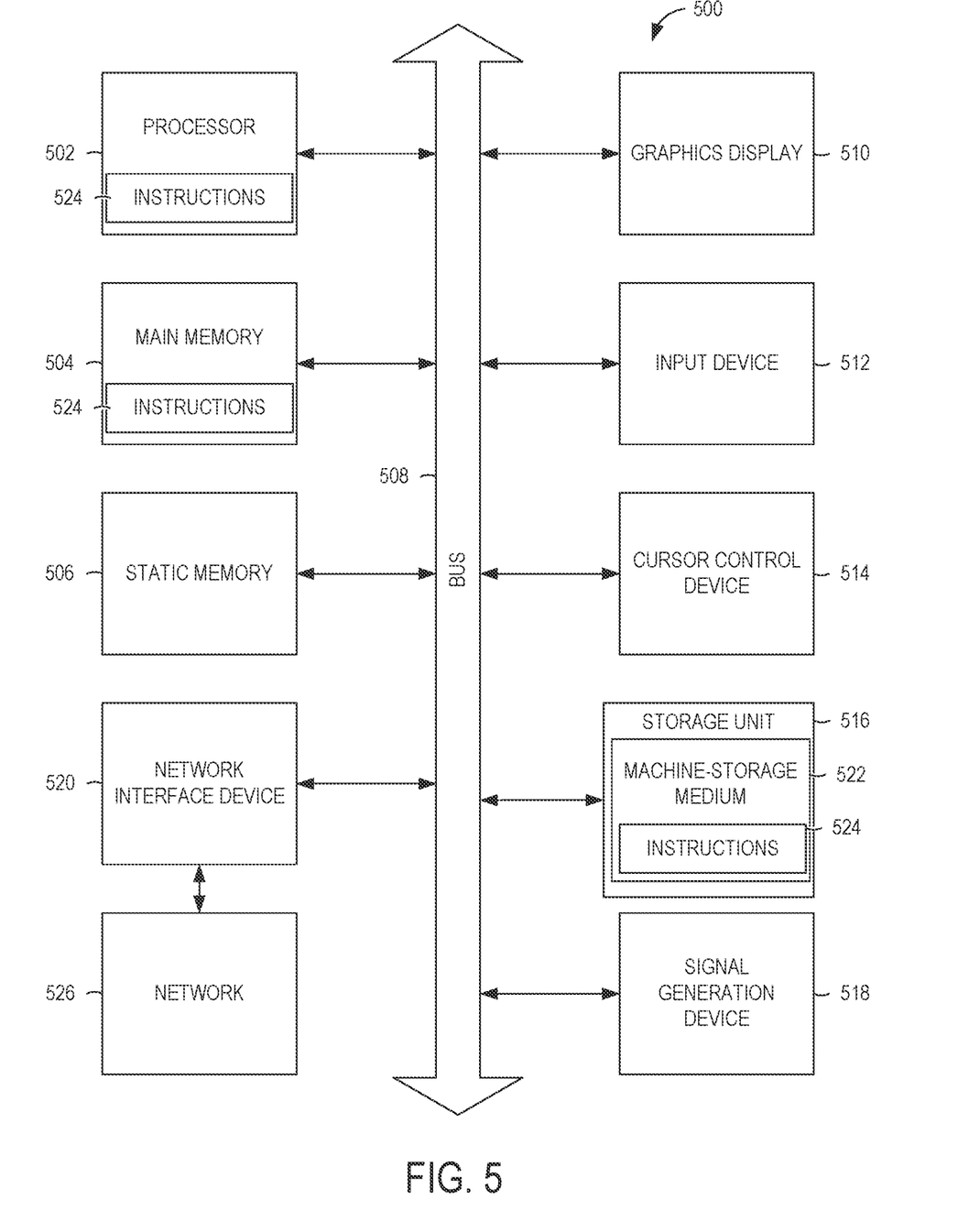
FIG. 5 is a block diagram illustrating components of a machine, according to some example embodiments, able to read instructions from a machine-storage medium and perform any one or more of the methodologies discussed herein.

FIG. 5 illustrates components of a machine 500, according to some example embodiments, that is able to read instructions from a machine-storage medium (e.g., a machine-storage device, a non-transitory machine-storage medium, a computer-storage medium, or any suitable combination thereof) and perform any one or more of the methodologies discussed herein. Specifically, FIG. 5 shows a diagrammatic representation of the machine 500 in the example form of a computer device (e.g., a computer) and within which instructions 524 (e.g., software, a program, an application, an applet, an app, or other executable code) for causing the machine 500 to perform any one or more of the methodologies discussed herein may be executed, in whole or in part.

For example, the instructions 524 may cause the machine 500 to execute the flow diagrams of FIG. 3 and FIG. 4. In one embodiment, the instructions 524 can transform the general, non-programmed machine 500 into a particular machine (e.g., specially configured machine) programmed to carry out the described and illustrated functions in the manner described.

In alternative embodiments, the machine 500 operates as a standalone device or may be connected (e.g., networked) to other machines. In a networked deployment, the machine 500 may operate in the capacity of a server machine or a client machine in a server-client network environment, or as a peer machine in a peer-to-peer (or distributed) network environment. The machine 500 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 524 (sequentially or otherwise) that specify actions to be taken by that machine. Further, while only a single machine is illustrated, the term "machine" shall also be taken to include a collection of machines that individually or jointly execute the instructions 524 to perform any one or more of the methodologies discussed herein.

The machine 500 includes a processor 502 (e.g., a central processing unit (CPU), a graphics processing unit (GPU), a digital signal processor (DSP), an application specific integrated circuit (ASIC), a radio-frequency integrated circuit (MC), or any suitable combination thereof), a main memory 504, and a static memory 506, which are configured to communicate with each other via a bus 508. The processor 502 may contain microcircuits that are configurable, temporarily or permanently, by some or all of the instructions 524 such that the processor 502 is configurable to perform any one or more of the methodologies described herein, in whole or in part. For example, a set of one or more microcircuits of the processor 502 may be configurable to execute one or more modules (e.g., software modules) described herein.

The machine 500 may further include a graphics display 510 (e.g., a plasma display panel (PDP), a light emitting diode (LED) display, a liquid crystal display (LCD), a projector, or a cathode ray tube (CRT), or any other display capable of displaying graphics or video). The machine 500 may also include an input device 512 (e.g., a keyboard), a cursor control device 514 (e.g., a mouse, a touchpad, a trackball, a joystick, a motion sensor, or other pointing instrument), a storage unit 516, a signal generation device 518 (e.g., a sound card, an amplifier, a speaker, a headphone jack, or any suitable combination thereof), and a network interface device 520.

The storage unit 516 includes a machine-storage medium 522 (e.g., a tangible machine-storage medium) on which is stored the instructions 524 (e.g., software) embodying any one or more of the methodologies or functions described herein. The instructions 524 may also reside, completely or at least partially, within the main memory 504, within the processor 502 (e.g., within the processor's cache memory), or both, before or during execution thereof by the machine 500, Accordingly, the main memory 504 and the processor 502 may be considered as machine-readable media (e.g., tangible and non-transitory machine-readable media). The instructions 524 may be transmitted or received over a network 526 via the network interface device 520.

In some example embodiments, the machine 500 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 504, 506, and/or memory of the processor(s) 502) and/or storage unit 516 may store one or more sets of instructions and data structures (e.g., software) 524 embodying or utilized by any one or more of the methodologies or functions described herein. These instructions, when executed by processor(s) 502 cause various operations to implement the disclosed embodiments.

As used herein, the terms "machine-storage medium," "device-storage medium," "computer-storage medium" (referred to collectively as "machine-storage medium 522") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 522 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage medium or media, computer-storage medium or media, and device-storage medium or media 522 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 524 may further be transmitted or received over a communications network 526 using a transmission medium via the network interface device 520 and utilizing any one of a number of well-known transfer protocols (e.g., HTTP). Examples of communication networks 526 include a local area network (LAN), a wide area network (WAN), the Internet, mobile telephone networks, plain old telephone service (POTS) networks, and wireless data networks (e.g., Wi-Fi, LTE, and WiMAX networks). The term "transmission medium" shall be taken to include any intangible medium that is capable of storing, encoding, or carrying instructions 524 for execution by the machine 500, and includes digital or analog communications signals or other intangible medium to facilitate communication of such software.

Throughout this specification, plural instances may implement components, operations, or structures described as a single instance, Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-storage medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Examples

Example 1 is a method for email threading based on machine learning determined categories and features. The method can be performed by one or more hardware processors and comprises accessing a plurality of emails addressed to a user; classifying, using a machine learning model, each email into at least one of a plurality of categories; for a category of the plurality of categories, extracting one or more feature values from each email in the category; based on the category and the extracted feature values, grouping messages having a same feature value in the category together into a single email thread; and causing presentation of information related to the single email thread at a client device of the user.

In example 2, the subject matter of example 1 can optionally include wherein each category comprises a different set of feature values.

In example 3, the subject matter of any of examples 1-2 can optionally include extracting a state value from each of at least some of the plurality of emails.

In example 4, the subject matter of any of examples 1-3 can optionally include wherein the causing presentation of the information comprises causing presentation of an email having a current state based on the extracted state values as a primary email in the single email thread.

In example 5, the subject matter of any of examples 1-4 can optionally include wherein the causing presentation of the information further comprises deleting, marking for deletion, or archiving any emails having a state prior to the current state.

In example 6, the subject matter of any of examples 1-5 can optionally include wherein the causing presentation of the information comprises extracting pertinent information from one or more emails in the single email thread; and causing presentation of the pertinent information as one or more chat messages within a chat thread.

In example 7, the subject matter of any of examples 1-6 can optionally include wherein each chat thread is delineated with a different chat title derived from the same feature value.

In example 8, the subject matter of any of examples 1-7 can optionally include wherein the one or more chat messages within the chat thread are presented via a chatbot.

In example 9, the subject matter of any of examples 1-8 can optionally include receiving, via a chatbot, instructions to perform actions with respect to one or more of the chat messages.

In example 10, the subject matter of any of examples 1-9 can optionally include determining training data based on the instructions received via the chatbot; and training a preference model using the training data.

In example 11, the subject matter of any of examples 1-10 can optionally include wherein the grouping the messages comprises using a display template for organizing the messages in the single message thread, each category having a different display template.

In example 12, the subject matter of any of examples 1-11 can optionally include wherein the extracting the one or more feature values comprises using a machine-learning natural language model to identify the one or more feature values.

Example 13 is a system for email threading based on machine learning determined categories and features. The system comprises one or more hardware processors and a memory storing instructions that, when executed by the one or more hardware processors, cause the one or more hardware processors to perform operations comprising accessing a plurality of emails addressed to a user; classifying, using a machine learning model, each email into at least one of a plurality of categories; for a category of the plurality of categories, extracting one or more feature values from each email in the category; based on the category and the extracted feature values, grouping messages having a same feature value in the category together into a single email thread; and causing presentation of information related to the single email thread at a client device of the user.

In example 14 the subject matter of example 13 can optionally include wherein the operations further comprise extracting a state value from each of at least some of the plurality of emails.

In example 15, the subject matter of any of examples 13-14 can optionally include wherein the causing presentation of the information comprises causing presentation of an email having a current state based on the extracted state values as a primary email in the single email thread.

In example 16, the subject matter of any of examples 13-15 can optionally include wherein the causing presentation of the information comprises extracting pertinent information from one or more emails in the single email thread; and causing presentation of the pertinent information as one or more chat messages within a chat thread In example 17, the subject matter of any of examples 13-16 can optionally include wherein each chat thread is delineated with a different chat title derived from the same feature value.

In example 18, the subject matter of any of examples 13-17 can optionally include wherein the one or more chat messages within the chat thread are presented via a chatbot.

In example 19, the subject matter of any of examples 13-18 can optionally include wherein the operations further comprise receiving, via a chatbot, instructions to perform actions with respect to one or more of the chat messages; determining training data based on the instructions received via the chatbot; and training a preference model using the training data.

Example 20 is a computer-storage medium comprising instructions which, when executed by one or more hardware processors of a machine, cause the machine to perform operations for email threading based on machine learning determined categories and features. The operations comprise accessing a plurality of emails addressed to a user; classifying, using a machine learning model, each email into at least one of a plurality of categories; for a category of the plurality of categories, extracting one or more feature values from each email in the category; based on the category and the extracted feature values, grouping messages having a same feature value in the category together into a single email thread; and causing presentation of information related to the single email thread at a client device of the user.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
   training a preference model using training data obtained from feedback received from a user;
   accessing a plurality of emails addressed to a user;
   classifying, using a machine learning model, each email into at least one of a plurality of categories;
   for a category of the plurality of categories, extracting one or more feature values from each email in the category;
   based on the category and the extracted feature values, grouping messages having a same feature value in the category together into a single email thread;
   based on the preference model, causing presentation of information related to the single email thread as one or more chat messages at a client device of the user;
   receiving additional feedback based on one or more interactions with the one or more chat messages via a chatbot; and
   retraining the preference model based on the additional feedback.

2. The method of claim 1, wherein each category comprises a different set of feature values.

3. The method of claim 1, further comprising extracting a state value from each of at least some of the plurality of emails.

4. The method of claim 3, further comprising causing presentation of an email having a current state based on the extracted state values as a primary email in the single email thread.

5. The method of claim 4, wherein the causing presentation of the email having the current state as the primary email further comprises deleting, marking for deletion, or archiving any emails having a state prior to the current state.

6. The method of claim 1, wherein the causing presentation of the information comprises
   extracting the information from one or more emails in the single email thread for presentation in the one or more chat messages within a chat thread.

7. The method of claim 6, wherein each chat thread is delineated with a different chat title derived from the same feature value.

8. The method of claim 6, wherein the one or more chat messages within the chat thread are presented via the chatbot.

9. The method of claim 6, wherein the additional feedback is based on instructions to perform actions with respect to the one or more chat messages.

10. The method of claim 9, further comprising
determining new training data based on the instructions received via the chatbot to retrain the preference model.

11. The method of claim 1, wherein the grouping the messages comprises using a display template for organizing the messages in the single message thread, each category having a different display template.

12. The method of claim 1, wherein the extracting the one or more feature values comprises using a machine-learning natural language model to identify the one or more feature values.

13. A system comprising:
one or more hardware processors; and
a memory storing instructions that, when executed by the one or more hardware processors, cause the one or more hardware processors to perform operations comprising:
training a preference model using training data obtained from feedback received from a user;
accessing a plurality of emails addressed to a user;
classifying, using a machine learning model, each email into at least one of a plurality of categories;
for a category of the plurality of categories, extracting one or more feature values from each email in the category;
based on the category and the extracted feature values, grouping messages having a same feature value in the category together into a single email thread;
based on the preference model, causing presentation of information related to the single email thread as one or more chat messages at a client device of the user;
receiving additional feedback based on one or more interactions with the one or more chat messages via a chatbot; and
retraining the preference model based on the additional feedback.

14. The system of claim 13, wherein the operations further comprise extracting a state value from each of at least some of the plurality of emails.

15. The system of claim 14, wherein the operations further comprise causing presentation of an email having a current state based on the extracted state values as a primary email in the single email thread.

16. The system of claim 13, wherein the causing presentation of the information comprises
extracting the information from one or more emails in the single email thread for presentation in the one or more chat messages within a chat thread.

17. The system of claim 16, wherein each chat thread is delineated with a different chat title derived from the same feature value.

18. The system of claim 13, wherein the one or more chat messages within the chat thread are presented via the chatbot.

19. The system of claim 16, wherein the additional feedback is based on instructions to perform actions with respect to the one or more chat messages, the operations further comprising
determining new training data based on the instructions received via the chatbot to retrain the preference model.

20. A computer-storage medium comprising instructions which, when executed by one or more hardware processors of a machine, cause the machine to perform operations comprising:
training a preference model using training data obtained from feedback received from a user;
accessing a plurality of emails addressed to a user;
classifying, using a machine learning model, each email into at least one of a plurality of categories;
for a category of the plurality of categories, extracting one or more feature values from each email in the category;
based on the category and the extracted feature values, grouping messages having a same feature value in the category together into a single email thread;
based on the preference model, causing presentation of information related to the single email thread as one or more chat messages at a client device of the user;
receiving additional feedback based on one or more interactions with the one or more chat messages via a chatbot; and
retraining the preference model based on the additional feedback.

* * * * *